tates Patent Office 3,264,270
Patented August 2, 1966

3,264,270
POLYIMIDES
James Eric McIntyre, Harrogate, England, assignor to Imperial Chemical Industries Limited, London, England, a corporation of Great Britain
No Drawing. Filed Feb. 20, 1963, Ser. No. 260,042
Claims priority, application Great Britain, Feb. 20, 1962, 6,549/62
3 Claims. (Cl. 260—78)

This invention relates to novel polyimides, more particularly to polyimides which are suitable for conversion into shaped articles such as fibres, films and the like.

The manufacture of polyimides is described in British patent specification 627,205 and in United States Patent 2,900,369. In the polymers described in these specifications the imide linkages are contained in a ring system.

We have now found that polyimides of the repeat unit

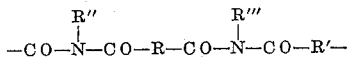

(where R and R' are the same or different aliphatic or aromatic divalent radicals, and R'' and R''' are the same or different monovalent alkyl or aryl radicals) can be produced having a high molecular weight and therefore suitable for the manufacture of fibres, films, shaped articles and the like.

According to my invention we provide a polyimide as hereinafter defined containing repeat units of the formula:

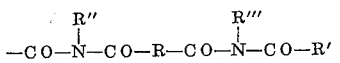

where R and R' are aliphatic or aromatic divalent radicals. R'' and R''' are monovalent alkyl or aryl radicals.

By the term "polyimide" we mean polymers of the repeat unit

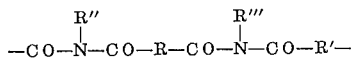

where R, R', R'' and R''' are defined as above, polyimides which are formally derived from more than two carboxylic acids and copolymers wherein up to 50% of the chain-linking units are units other than imide units, such for example, as ether, ester or anhydride units.

The polyimides of our invention may be prepared, for example, by the reaction of a dicarboxylic acid or salt of a dicarboxylic acid with a di(N-substituted imidoyl chloride) or by the reaction of a diacid chloride of a dicarboxylic acid with a di(N-mono-substituted amide).

The copolymers may be prepared, for example:

In the case of those containing ether groups, by the derivation of a proportion of one of the starting products from a dicarboxylic acid containing an ether group.

In the case of those containing ester groups, by the derivation of a proportion of one of the starting products from a dicarboxylic acid containing an ester group.

In the case of those containing anhydride groups, by the reaction of a diacid chloride of a dicarboxylic acid with the stoichiometrical amount of a suitable mixture of a di(N-mono-substituted amide) and an amido acid.

Although the reaction of a diamide derived from one dicarboxylic acid with an acid chloride derived from another might formally be expected to give rise to a polymer with units R and R¹ derived alternately from the one acid and from the other, we do not believe that the products which we obtain are alternating in structure since we find that amide exchange can occur during the earliest stages of the reaction. This reaction is most readily shown to occur where a product of amide exchange is relatively insoluble in the reaction medium; for example, reaction of N,N¹-diphenyl sebacamide with terephthaloyl chloride in refluxing ortho-dichlorobenzene leads to precipitation of N,N¹-diphenylterephthalamide, and if the reaction between N,N¹-dibutyl oxamide and terephthaloyl chloride in refluxing ortho-dichlorobenzene is stopped during the early stages, N,N¹-dibutylterephthalamide precipitates on cooling.

The following examples, in which the parts are by weight, illustrate, but do not limit, our invention.

Example 1

N,N'-dimethyl terephthalamide (1.92 parts) and terephthaloyl chloride (2.03 parts) were heated together in ortho dichlorobenzene (25 parts). A stream of dry nitrogen was passed through the refluxing mixture and the hydrogen chloride evolved was swept into and absorbed by water and titrated at intervals with a standard solution of sodium hydroxide. When 96% of the theoretically obtainable hydrogen chloride for complete reaction had been evolved, the reaction mixture was allowed to cool. The poly(N-methyl terephthalimide) isolated by filtration had a crystalline melting point of 301–308° C.

Example 2

N,N'-dimethyl isophthalamide (4.79 parts) and isophthaloyl chloride (5.07 parts) were heated together in ortho-dichlorobenzene (250 parts) as in Example 1 until 94% of the theoretical hydrogen chloride had been evolved. On cooling only a small amount of product separated; this was filtered off. The bulk of the poly(N-methyl isophthalimide) was precipitated by addition of light petroleum; it had a crystalline melting point of 235° C. but was less highly crystalline than the polymer formed in Example 1.

Example 3

A solution of N,N'-dimethyl terephthalimidoyl chloride (0.5 part) in methylene chloride (5 parts) was shaken with a solution of terephthalic acid (0.35 part) in 4% (by weight) aqueous sodium hydroxide (10 parts) at 0–10° C. for one hour. The precipitate was filtered off, washed with water and methylene chloride, then extracted with boiling ethanol to remove a little N,N'-dimethyl terephthalamide. The product was poly(N-methyl terephthalimide) similar to that obtained in Example 1 but of lower molecular weight.

Example 4

N,N' - dimethylterephthalamide (1.92 parts) and sebacoyl chloride (2.39 parts) were heated together in ortho-dichloro-benzene (25 parts), under the conditions described in Example 1 until 98.75% of the theoretically obtainable hydrogen chloride had been evolved. The reaction mixture was allowed to cool, and the product was precipitated by addition of light petroleum; the supernatant liquor was decanted off, and the residue was washed with light petroleum and dried at 140° C. The product was an amorphous resin.

Example 5

N,N' - dibutylsebacamide (3.12 parts) and sebacoyl chloride (2.39 parts) were heated together in ortho-dichlorobenzene (25 parts) under the conditions described in Example 1 until 97.5% of the theoretical hydrogen chloride had been evolved. The reaction mixture was allowed to cool, and the product was precipitated with light petroleum, separated, washed with light petroleum and dried. The polymer was a viscous syrup.

Example 6

N,N' - diphenylsebacamide (3.12 parts) and sebacoyl chloride (2.40 parts) were reacted together in ortho-dichlorobenzene as described in Example 1. After 3½ hours the mixture was cooled, and the product was precipitated with light petroleum, separated, washed with light petroleum, and dried. The polymer was a viscous syrup.

*Example 7*

N,N'-dimethyl terephthalamide (0.50 part) and isophthaloyl chloride (0.53 part) were reacted together in orthodichlorobenzene as described in Example 1. After 24 hours the mixture was cooled and filtered and the product was precipitated with light petroleum, separated, washed with light petroleum, and dried. The polymer was a solid which softened at 142° C.; a trace of birefringence was present and finally disappeared at 237° C.

N,N'-dimethyl isophthalamide (0.50 part) and terephthaloyl chloride (0.53 part), reacted similarly, gave a similar product.

*Example 8*

N,N'-dibutylsuccinamide (2.28 parts) and sebacoyl chloride (2.39 parts) were reacted as in Example 1 in orthodichlorobenzene. 99% of the theoretical hydrogen chloride was evolved. Light petroleum was added in the cooled mixture to precipitate the product, which was separated, washed with light petroleum, and dried. The polymer was a viscous syrup.

*Example 9*

N,N'-diphenyl terephthalamide (1.58 parts) and terephthaloyl chloride (1.02 parts) were reacted together in dry nitrobenzene (12.5 parts) under the conditions described in Example 1. The mixture was cooled, filtered, and treated with light petroleum to precipitate the product which was washed with further light petroleum then dried to provide the polymer, a pale yellow amorphous solid softening at 120–190° C.

The preparation was repeated using ethyl benzoate as solvent instead of nitrobenzene, and the product was isolated as above. The polymer was amorphous and softened at 182–192° C.

What I claim is:

1. A polyamide consisting of repeat units of the formula:

$$-CO-N(R'')-CO-R-CO-N(R''')-CO-R'-$$

where R and R' are taken from the group consisting of saturated aliphatic hydrocarbon and aromatic hydrocarbon divalent radicals and R'' and R''' are taken from the group consisting of monovalent alkyl and aryl radicals.

2. A polyamide as claimed in claim 1 in which R is an aromatic radical.

3. A polyamide as claimed in claim 1 in which R' is an aromatic radical.

References Cited by the Examiner

UNITED STATES PATENTS 2,230,326　2/1941　Hovey et al. _____ 260—78
2,272,466　2/1942　Hummel et al. _____ 260—78

FOREIGN PATENTS 475,839　8/1951　Canada.

OTHER REFERENCES

The Naming and Indexing of Chemical Compounds from Chemical Abstracts. Introduction to the Subject Index of volume 56.

SAMUEL H. BLECH, *Primary Examiner.*

WILLIAM H. SHORT, LOUISE P. QUAST, *Examiners.*

H. D. ANDERSON, *Assistant Examiner.*